(12) United States Patent
Tanaka

(10) Patent No.: US 10,794,485 B2
(45) Date of Patent: Oct. 6, 2020

(54) VEHICLE PARKING MECHANISM

(71) Applicant: Honda Motor Co., Ltd., Tokyo (JP)

(72) Inventor: Shuhei Tanaka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 82 days.

(21) Appl. No.: 16/361,238

(22) Filed: Mar. 22, 2019

(65) Prior Publication Data

US 2019/0301604 A1 Oct. 3, 2019

(30) Foreign Application Priority Data

Apr. 3, 2018 (JP) ................................ 2018-071754

(51) Int. Cl.
*F16H 63/34* (2006.01)
*F16H 1/28* (2006.01)
*B60K 6/365* (2007.10)
*B60K 1/00* (2006.01)

(52) U.S. Cl.
CPC ......... *F16H 63/3441* (2013.01); *B60K 6/365* (2013.01); *F16H 1/28* (2013.01); *B60K 1/00* (2013.01); *B60K 2001/001* (2013.01); *F16H 2001/289* (2013.01)

(58) Field of Classification Search
CPC .. F16H 63/3441; F16H 2001/289; F16H 1/28; B60K 6/365; B60K 2001/001
See application file for complete search history.

(56) References Cited

U.S. PATENT DOCUMENTS

| 6,830,526 | B2 * | 12/2004 | Stettler, Jr. | ............... | F16H 3/54 |
| | | | | | 475/140 |
| 9,651,119 | B2 * | 5/2017 | Scholle | ............... | F16H 63/3441 |
| 10,041,570 | B2 * | 8/2018 | Iwase | ................. | F16H 63/3425 |
| 10,378,629 | B2 * | 8/2019 | Hiyoshi | ................. | B60T 1/005 |
| 10,630,140 | B2 * | 4/2020 | Pritchard | ............ | F16H 57/0476 |
| 2004/0138021 | A1 | 7/2004 | Stettler, Jr. | | |
| 2016/0201770 | A1 * | 7/2016 | Scholle | ............... | F16H 63/3416 |
| | | | | | 475/5 |
| 2016/0265630 | A1 * | 9/2016 | Iwase | ...................... | F16H 3/663 |

(Continued)

FOREIGN PATENT DOCUMENTS

| CN | 1154316 | 7/1997 |
| CN | 102958727 | 3/2013 |

(Continued)

OTHER PUBLICATIONS

"Office Action of China Counterpart Application", dated Jun. 15, 2020, with English translation thereof, p. 1-p. 9.

*Primary Examiner* — David R Morris
(74) *Attorney, Agent, or Firm* — JCIPRNET

(57) ABSTRACT

A vehicle parking mechanism according to the disclosure is a mechanism provided in a vehicle power transmission device that transmits power output from an electric motor to left and right axles and through two planetary gear mechanisms and a differential device, wherein, in a carrier of one of the two planetary gear mechanisms and, a piston engaged and disengaged with and from a carrier of the other is slidably provided, wherein the piston is engaged with the carrier of the other planetary gear mechanism when a vehicle is stopped, and wherein the piston is disengaged from the carrier of the other planetary gear mechanism other than when the vehicle is stopped.

7 Claims, 4 Drawing Sheets

(56) References Cited

U.S. PATENT DOCUMENTS

2018/0076687 A1\* 3/2018 Pritchard ................. B60K 1/02
2018/0180150 A1\* 6/2018 Hiyoshi .................. B60T 1/005
2019/0285175 A1\* 9/2019 Tanaka ..................... F16H 3/58

FOREIGN PATENT DOCUMENTS

| CN | 104595475 | 5/2015 |
| --- | --- | --- |
| CN | 106195161 | 12/2016 |
| JP | H07285422 | 10/1995 |
| JP | 2009061923 | 3/2009 |
| WO | 9304305 | 3/1993 |

\* cited by examiner

VEHICLE PARKING MECHANISM

CROSS-REFERENCE TO RELATED APPLICATION

This application claims the priority of Japan patent application serial no. 2018-071754, filed on Apr. 3, 2018. The entirety of the above-mentioned patent application is hereby incorporated by reference herein and made a part of this specification.

BACKGROUND

Technical Field

The disclosure relates to a parking mechanism provided in a vehicle power transmission device.

Description of Related Art

For example, while an electric motor (a motor and a generator) is used as a driving source of an electric vehicle (EV vehicle), power output from the electric motor is transmitted to the left and right axles through a planetary gear mechanism as a deceleration mechanism and a differential device, and thereby left and right driving wheels are driven to rotate.

Incidentally, a parking mechanism for preventing rotation of left and right axles during parking is provided in a vehicle. Patent Document 1 discloses a configuration in which parking gears meshed with the parking mechanism are integrally formed with carriers of the planetary gear mechanism of the power transmission device.

In addition, Patent Document 2 proposes a configuration in which a parking gear is disposed between an electric motor of a power transmission device and a deceleration mechanism, a torsion axle constituting a buffer mechanism is disposed between the parking gear and the electric motor, and shock when a parking lock operation is performed is absorbed by rotating of the torsion axle.

PATENT DOCUMENTS

[Patent Document 1] Japanese Laid-Open No. 2009-061923
[Patent Document 2] Japanese Laid-Open No. H7-285422

However, in the configurations disclosed in Patent Document 1 and 2, there is a problem of the size of the power transmission device increasing because it is necessary to dispose a component other than a parking gear constituting the parking mechanism, for example, a parking lock pole engaged with and disengaged from the parking gear, on the outer circumferential side of the parking gear. In addition, there are also problems that, since a detent plate, a lock cam, and the like are necessary to drive a parking lock pole, the number of installation items increases, the structure of the parking lock mechanism becomes complicated, and cost increase.

SUMMARY

A vehicle parking mechanism according to the disclosure is a mechanism provided in a vehicle power transmission device that transmits power output from a driving source to left and right axles and through two planetary gear mechanisms and, and a differential device, wherein, in a carrier of one of the two planetary gear mechanisms and, a piston engaged and disengaged with and from a carrier of the other is slidably provided, wherein the piston is engaged with the carrier of the other planetary gear mechanism when a vehicle is stopped, and wherein the piston is disengaged from the carrier of the other planetary gear mechanism other than when the vehicle is stopped.

DESCRIPTION OF THE EMBODIMENTS

Figure 1A:
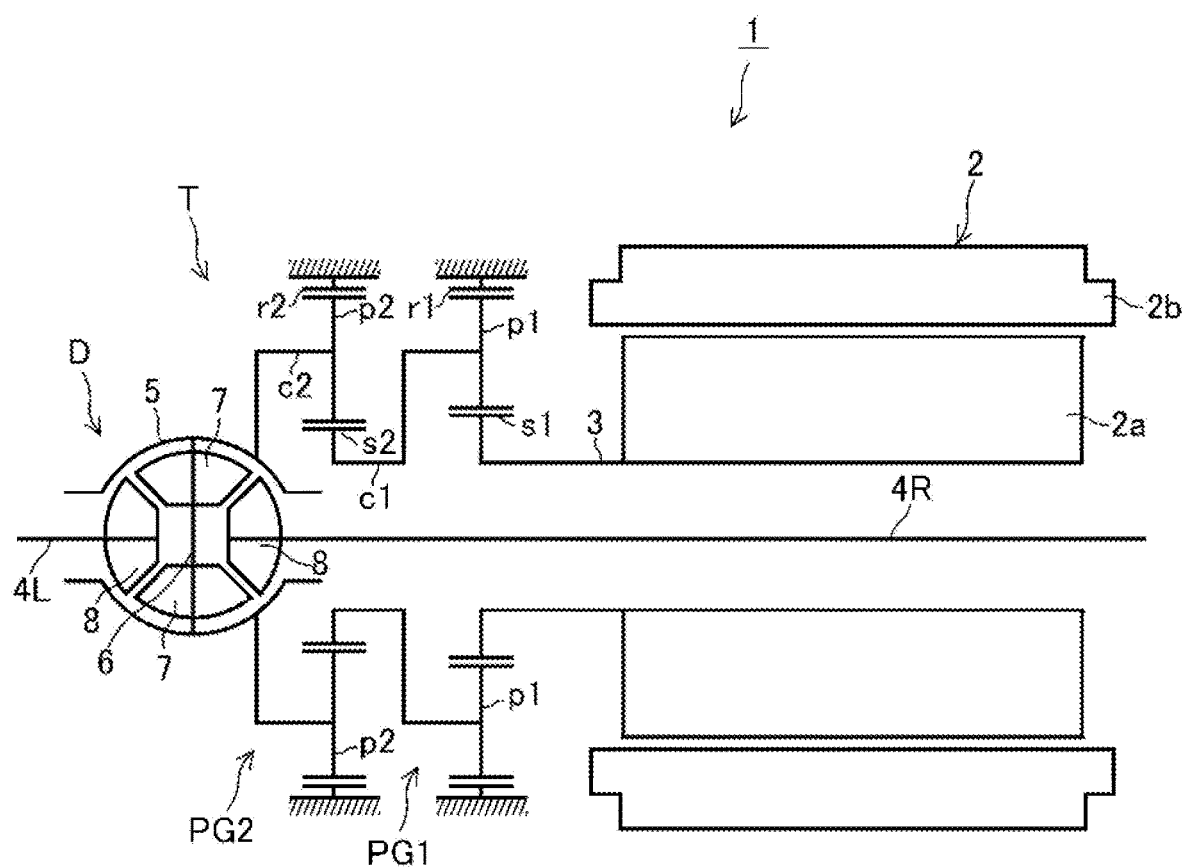
FIG. 1A is a schematic diagram showing a basic configuration of a power transmission device including a vehicle parking mechanism according to the disclosure.

The disclosure provides a vehicle parking mechanism through which it is possible to reduce the number of components, it is possible to simplify the structure, and it is possible to reduce cost without causing an increase in size of a power transmission device.

A vehicle parking mechanism according to the disclosure is a mechanism provided in a vehicle power transmission device 1 that transmits power output from a driving source 2 to left and right axles 4L and 4R through two planetary gear mechanisms PG1 and PG2, and a differential device D, wherein, in a carrier c2 of one (PG2) of the two planetary gear mechanisms PG1 and PG2, a piston 27 engaged and disengaged with and from a carrier c1 of the other (PG1) is slidably provided, wherein the piston 27 is engaged with the carrier c1 of the other planetary gear mechanism PG1 when a vehicle is stopped, and wherein the piston 27 is disengaged from the carrier c1 of the other planetary gear mechanism PG1 other than when the vehicle is stopped.

According to the vehicle parking mechanism of the disclosure, there is no need to provide a parking gear, a parking lock pole engaged with and disengaged from the parking gear, and a detent plate and a lock cam for driving the parking lock pole, which are required in the related art, and the entire parking mechanism can be accommodated in the power transmission device. Therefore, it is possible to reduce the size of the power transmission device, it is possible to reduce the number of components constituting the parking mechanism, it is possible to reduce the size of the parking mechanism, it is possible to simplify the structure, and it is possible to reduce cost.

For example, in the disclosure, spindles 11 and 19 that rotatably support planetary gears p1 and p2 may be fixed to the carriers c1 and c2 of the two planetary gear mechanisms PG1 and PG2, wherein, in the spindle 19 of one planetary gear mechanism PG2, the piston 27 may be accommodated so that it is slidable in an axial direction, a spring 28 that biases the piston 27 toward the other planetary gear mechanism PG1 may be accommodated, and wherein, in the spindle 11 of the other planetary gear mechanism PG1, an engaging hole 18 for engagement and disengagement with respect to the piston 27 may be formed.

In addition, in the disclosure, in an oil path 23 formed in the spindle 19 of one planetary gear mechanism PG2, the piston 27 may be accommodated so that it is slidable in the axial direction, and the spring 28 is accommodated, wherein, when a vehicle is stopped, the piston 27 biased by the spring 28 may be engaged with the engaging hole 18 formed in the spindle 11 of the other planetary gear mechanism PG1, and the state may become a parking ON state, and wherein the piston 27 may be slid against a biasing force of the spring 28 due to a hydraulic pressure of oil that flows through the oil path 23 other than when the vehicle is stopped, and may be disengaged from the engaging hole 18 formed in the spindle 11 of the other planetary gear mechanism PG1, and the state may become a parking OFF state.

In addition, in the disclosure, the piston 27 may be engaged with the engaging hole 18 formed in the spindle 11 of the other planetary gear mechanism PG1 when rotation phases of both the carriers c1 and c2 are matched.

Alternatively, in the disclosure, the periphery of an opening of the engaging hole 18 formed in the spindle 11 of the other planetary gear mechanism PG1 may be chamfered.

According to the disclosure, it is possible to reduce the number of components, it is possible to simplify the structure of the parking mechanism, and it is possible to reduce costs without causing an increase in size of the power transmission device.

Embodiments of the disclosure will be described below with reference to the appended drawings.

[Power Transmission Device]

First, a basic configuration and operations of a vehicle power transmission device including a parking mechanism according to the disclosure will be described with reference to FIGS. 1A and 1B.

Figure 1B:
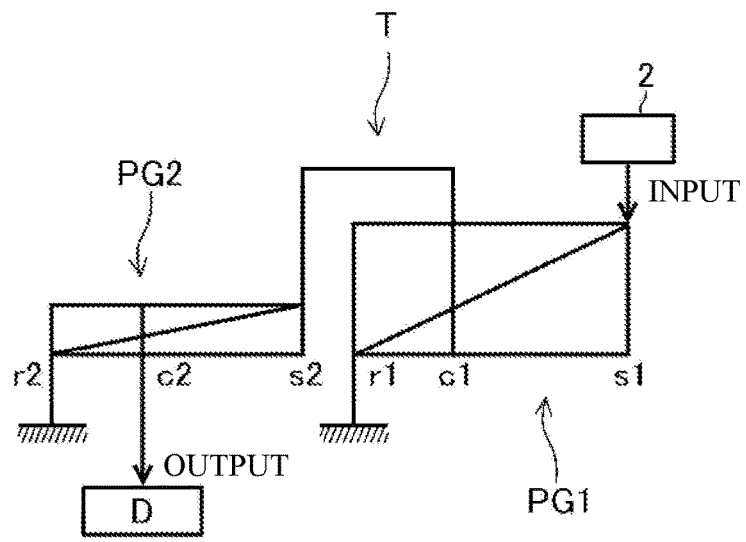
FIG. 1B is a speed diagram of a deceleration mechanism of the same power transmission device.

FIG. 1A is a schematic diagram showing a basic configuration of the power transmission device including the parking mechanism according to the disclosure, and FIG. 1B is a speed diagram of a deceleration mechanism of the same power transmission device. A power transmission device 1 shown in FIG. 1A is provided in an electric vehicle (EV vehicle), and includes an electric motor (a motor and a generator) 2 as a driving source.

In the present embodiment, the electric motor 2 is a 3-phase brushless motor, and includes a hollow rotor 2a rotatably accommodated in a motor case (not shown) and a ring-shaped stator 2b fixed around the rotor 2a. Although not shown, a plurality of permanent magnets are built into the rotor 2a, and coils corresponding to three phases are wound around the stator 2b.

At the axial center of the rotor 2a of the electric motor 2, a cylindrical rotor shaft 3 that is elongated in a vehicle width direction (the left to right direction in FIG. 1A) is inserted and fixed, and the rotor shaft 3 rotates together with the rotor 2a according to rotational power output from the electric motor 2.

In addition, an axle 4R on the right side is inserted coaxially with the rotor shaft 3 into the rotor shaft 3, and rotation of the rotor shaft 3 is transmitted to the axle 4R through a deceleration mechanism T and a differential device D. Here, the deceleration mechanism T and the differential device D are disposed coaxially with the rotor shaft 3 and the axle 4R.

The differential device D includes a pair of pinion gears 7 that are rotatably supported by a pinion shaft 6 and a pair of side gears 8 that are meshed with these pinion gears 7, which are accommodated in a gear case 5. Here, one side gear 8 (on the right side in FIG. 1A) provided in the differential device D is connected to the axle 4R on the right side, and the other side gear 8 (on the left side in FIG. 1A) is connected to an axle 4L on the left side that is disposed coaxially with the axle 4R on the right side. Here, although not shown, left and right driving wheels are attached to ends of the left and right axles 4L and 4R, respectively.

In addition, the deceleration mechanism T includes both a first planetary gear mechanism PG1 and a second planetary gear mechanism PG2 connected in series, and the first planetary gear mechanism PG1 includes a sun gear s1 fixed to the outer circumference of one end (the left end in FIG. 1A) of the rotor shaft 3 in the axial direction, a ring gear r1 fixed around the sun gear s1, a plurality of planetary gears p1 that are meshed with both the sun gear s1 and the ring gear r1, turn, and revolve around the sun gear s1, and a carrier c1 that supports these planetary gears p1 so that they can rotate (turn).

In addition, the second planetary gear mechanism PG2 includes a sun gear s2 connected to the carrier c1 of the first planetary gear mechanism PG1, a ring gear r2 fixed around the sun gear s2, a plurality of planetary gears p2 that are meshed with both the sun gear s2 and the ring gear r2, and turn, and revolve around the sun gear s2, and a carrier c2 that supports these planetary gears p2 so that they can rotate (turn). Thus, the carrier c2 of the second planetary gear mechanism PG2 is attached to the gear case 5 of the differential mechanism D.

In the power transmission device 1 configured as described above, when power is supplied to the electric motor 2 from a power supply (not shown) such as a battery, the electric motor 2 is activated, the rotor shaft 3 rotates together with the rotor 2a, its rotation is decelerated in two steps by both the first planetary gear mechanism PG1 and the second planetary gear mechanism PG2 in series constituting the deceleration mechanism T and is transmitted to the differential device D. That is, when the rotor shaft 3 rotates, since the sun gear s1 of the first planetary gear mechanism PG1 rotates accordingly, and the plurality of planetary gears p1 turn and revolve around the sun gear s1 according to rotation of the sun gear s1, the carrier c1 that rotatably supports these planetary gears p1 rotates while decelerating (refer to FIG. 1B).

Here, since the sun gear s2 of the second planetary gear mechanism PG2 rotates together with the carrier c1 according to rotation of the carrier c1 of the first planetary gear mechanism PG1 and the plurality of planetary gears p2 turns and revolves around the sun gear s2 according to rotation of the sun gear s2, the carrier c2 that rotatably supports these planetary gears p2 rotates while decelerating (refer to FIG. 1B).

As described above, since rotation decelerated in two steps by both the first planetary gear mechanism PG1 and the second planetary gear mechanism PG2 is transmitted to the gear case 5 of the differential device D and the gear case 5 rotates, torque in the differential device D is divided into two part and transmitted to the left and right axles 4L and 4R, rotation of the left and right axles 4L and 4R is transmitted to driving wheels (not shown) and thereby the electric vehicle travels on the road.

Here, in the differential device D, when the electric vehicle travels in a straight line, since the left and right driving wheels receive the same resistance from the road surface, the pair of pinion gears 7 revolve together with the gear case 5, and distribute and transmit rotational power to the pair of left and right side gears 8. In this case, the pair of pinion gears 7 do not rotate (turn). On the other hand, during cornering when a vehicle turns, since there is a difference in resistance received from the road surface between the left and right driving wheels (a difference in the movement distance between the left and right driving wheels), the pair of pinion gears 7 turn, a rotational speed of one side gear 8 is made higher than a rotational speed of the other side gear 8, the electric vehicle performs cornering smoothly, and rotational power is distributed and transmitted to the left and right axles 4L and 4R.

[Parking Mechanism]

Figure 3A:
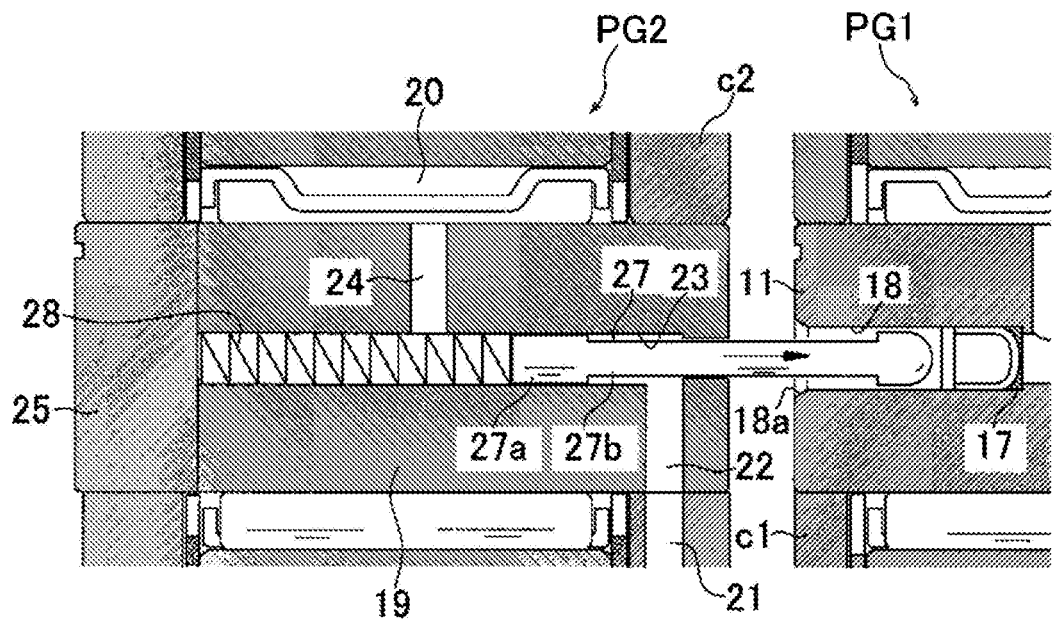
FIG. 3A is a cross-sectional view of an enlarged main part in FIG. 2 showing a parking ON state of the parking mechanism according to the disclosure and FIG. 3B is a cross-sectional view of an enlarged main part in FIG. 2 showing a parking OFF state of the same parking mechanism.
Figure 3B:
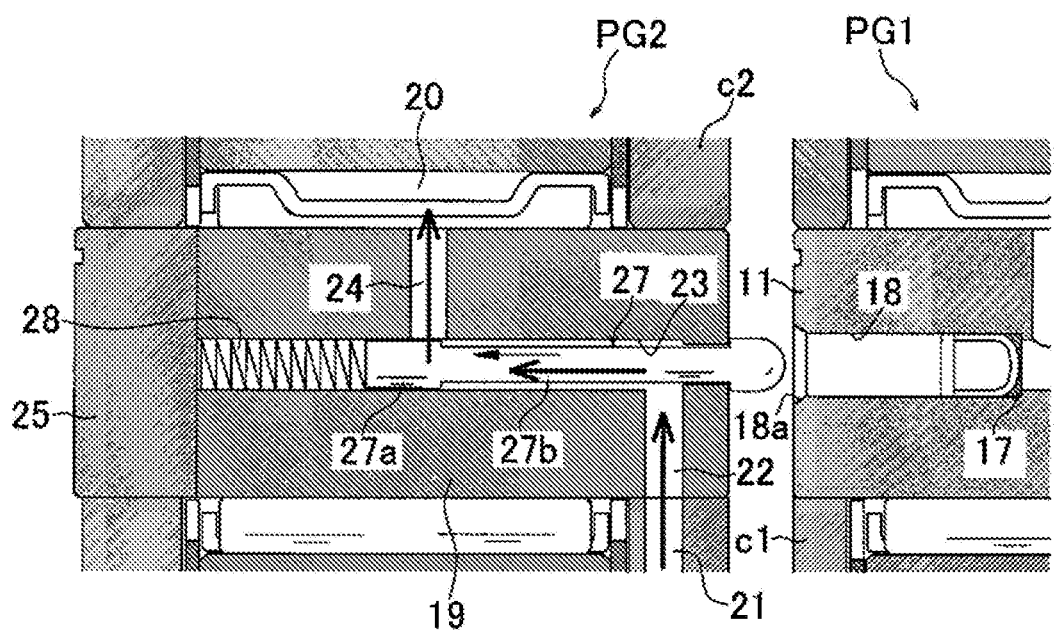
Figure 4:
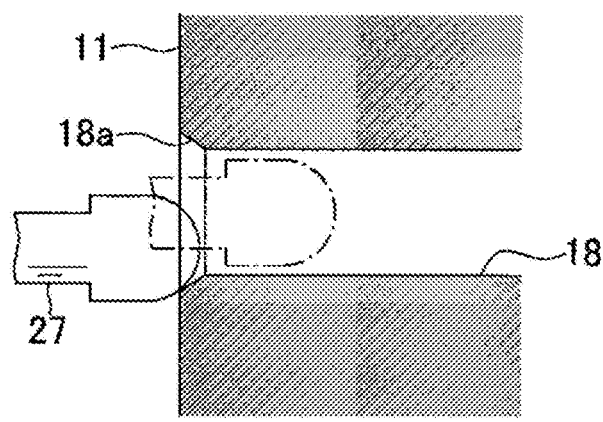
FIG. 4 is a partial cross-sectional view showing an operation in which a piston in the parking mechanism according to the disclosure is engaged with an engaging hole.

Next, the configuration and operations of the parking mechanism according to the disclosure will be described below with reference to FIG. 2 to FIG. 4.

Figure 2:
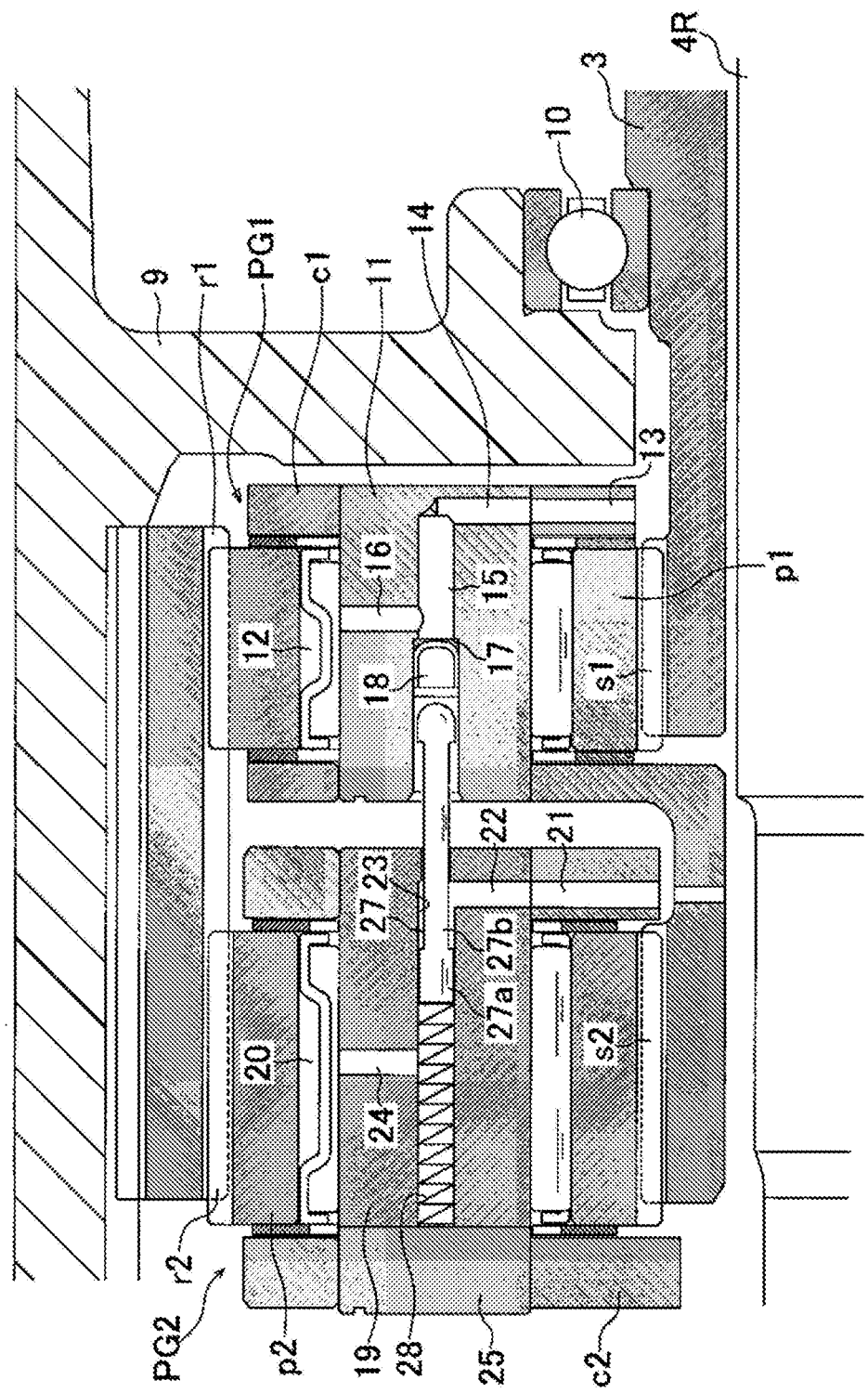
FIG. 2 is a cross-sectional view showing a half-cut main part of the power transmission device including the vehicle parking mechanism according to the disclosure.

FIG. 2 is a cross-sectional view showing a half-cut main part of the power transmission device including the vehicle parking mechanism according to the disclosure. FIG. 3A is a cross-sectional view of an enlarged main part in FIG. 2 showing a parking ON state of the parking mechanism according to the disclosure. FIG. 3B is a cross-sectional view of an enlarged main part in FIG. 2 showing a parking OFF state of the same parking mechanism. FIG. 4 is a partial cross-sectional view showing an operation in which a piston in the same parking mechanism is engaged with an engaging hole.

As shown in FIG. 2, in the first planetary gear mechanism PG1, the sun gear s1 is integrally formed at an end (the left end in FIG. 2) of the hollow rotor shaft 3 that is rotatably supported in a housing 9 by a bearing (ball bearing) 10, and the planetary gears p1 meshed with the sun gear s1 are rotatably (turnably) supported in a spindle 11 of which both ends in the axial direction are fixed to the carrier c1 by a bearing (needle bearing) 12. Then, an oil path 13 formed in the carrier c1 in the radial direction, an oil path 14 formed in the spindle 11 in the radial direction, an oil path 15 formed along the axial center of the spindle 11, and an oil path 16 that is formed from the oil path 15 in the radial direction and opens toward the bearing (needle bearing) 12 communicate with each other, and a lubricating oil is supplied to the bearing (needle bearing) 12 through these oil paths 13 to 16. Here, the oil path 15 formed at the axial center of the spindle 11 is blocked by a cap 17, and an end (the left end in FIG. 2) partitioned by the cap 17 of the oil path 15 constitutes an engaging hole 18 having a circular hole shape. Here, as shown in FIG. 4 in detail, the periphery of the opening of the engaging hole 18 is cut at 45° according to chamfering, and forms a guide surface 18a that opens in a tapered shape toward the outside (the left side in FIG. 4).

In addition, in the second planetary gear mechanism PG2, the sun gear s2 is connected to the carrier c1 of the first planetary gear mechanism PG1 by spline fitting, and the planetary gears p2 meshed with the sun gear s2 are rotatably (turnably) supported in a spindle 19 of which both ends in the axial direction are fixed to the carrier c2 by a bearing (needle bearing) 20. Then, an oil path 21 formed in the carrier c2 in the radial direction, an oil path 22 formed in the spindle 19 in the radial direction, an oil path 23 formed along the axial center of the spindle 19, and an oil path 24 that is formed from the oil path 23 in the radial direction and opens toward the bearing (needle bearing) 20 communicate with each other, and a lubricating oil is supplied to the bearing (needle bearing) 20 through the oil paths 21 to 24. Here, the oil path 23 formed at the axial center of the spindle 19 is blocked by a lid member 25 bonded to an end surface of the spindle 19. Here, the spindle 11 of the first planetary gear mechanism PG1 and the spindle 19 of the second planetary gear mechanism PG2 are disposed on the same circumference, and the carrier c1 of the first planetary gear mechanism PG1 and the carrier c2 of the second planetary gear mechanism PG2 are coaxially and relatively rotatable.

Incidentally, inside the oil path 23 formed at the axial center of the spindle 19 of the second planetary gear mechanism PG2, a piston 27 having a round bar shape is inserted so that it can slide in the axial direction (the left to right direction in FIG. 2), and a spring 28 that biases the piston 27 to the right side in FIG. 2 is accommodated. Here, a large diameter part 27a formed at one end (the left end in FIG. 2) of the piston 27 in the axial direction is loosely fitted to the oil path 23, and a tip of a small diameter part 27b that integrally extends from the large diameter part 27a of the same piston 27 in the axial direction is formed in a hemispherical shape. In addition, the spring 28 is compressed between the piston 27 and the lid member 25 in the oil path 23.

The piston 27 described above, the spring 28 that biases the piston 27, the engaging hole 18 with and from which the tip of the piston 27 is engaged and disengaged, the oil path 21 formed in the carrier c2 of the second planetary gear mechanism PG2, the oil paths 22 to 24 formed in the spindle 19, and the like constitute the parking mechanism according to the disclosure, and operations of the parking mechanism will be described below with reference to FIG. 3 and FIG. 4.

In the parking mechanism, due to a flow of a lubricating oil generated by an oil pump (not shown) that is driven by an electric motor (not shown) different from the electric motor 2, the piston 27 moves to a parking ON position or a parking OFF position as will be described below. That is, when the oil pump is stopped, a lubricating oil does not flow through the oil paths 21 to 24 formed in the second planetary gear mechanism PG2. Therefore, no force due to a hydraulic pressure acts on the piston 27, and as shown in FIG. 3A, the piston 27 is pushed out from the oil path 23 of the spindle 19 by the spring 28, and its tip is inserted into and engaged with the engaging hole 18 formed in the spindle 11 of the first planetary gear mechanism PG1. When the piston 27 is engaged with the engaging hole 18 in this manner, the carrier c1 of the first planetary gear mechanism PG1 and the carrier c2 of the second planetary gear mechanism PG2 are connected by the piston 27 and rotation is locked. That is, since the carrier c1 and the carrier c2 that rotate at different speeds are integrated and thus rotation of both the carriers c1 and c2 is locked, rotation of the left and right axles 4L and 4R and driving wheels (not shown) attached to the axles 4L and 4R is also locked, and the state becomes a parking ON state. Here, actually, until the piston 27 is engaged with the engaging hole 18, the electric motor 2 is driven, and both the carriers c1 and c2 rotate at a low speed, and as indicated by a solid line in FIG. 4, when the tip of the piston 27 comes in contact with the guide surface 18a of the engaging hole 18, the tip of the piston 27 is guided to the guide surface 18a, and is smoothly engaged with the engaging hole 18 as indicated by a dashed line in FIG. 4. Then, when the piston 27 is completely engaged with the engaging hole 18, driving of the electric motor 2 is stopped. As another method in which a rotation phase of the piston 27 is matched to a rotation phase of the engaging hole 18, and the piston 27 is smoothly engaged with the engaging hole 18, a method in which rotational speeds of the carriers c1 and c2 are detected by a resolver and thus rotation phase match is performed is conceivable.

On the other hand, when an oil pump rotates, since a lubricating oil flows through the oil paths 21 to 24 as indicated by an arrow in FIG. 3B, a pressure of the oil (hydraulic pressure) acts on the large diameter part 27a of the piston 27, and causes the piston 27 to slide to the left side (a direction indicated by an arrow) in FIG. 3B against a biasing force of the spring 28. As a result, since the tip of the piston 27 is disengaged from the engaging hole 18 formed in the spindle 11 of the first planetary gear mechanism PG1, locking of rotation of the carriers c1 and c2 of both planetary gear mechanisms PG1 and PG2 by the piston 27 is released, and these carriers c1 and c2, the left and right axles 4L and 4R, and driving wheels (not shown) can freely rotate, and the state becomes a parking OFF state, and the electric vehicle can travel. Here, a part of oil flowing through the oil path 23 is supplied to the bearing (needle bearing) 20 through the oil path 24 from a gap formed between the outer circumferential side of the large diameter part 27a of the piston 27 and the oil path 23, and is used to lubricate the bearing (needle bearing) 20.

As described above, in the parking mechanism according to the disclosure, there is no need to provide a parking gear, a parking lock pole engaged with and disengaged from the parking gear, a detent plate and a lock cam for driving the parking lock pole, and the like, which are required in the related art, and all of the piston 27, the spring 28, and the like constituting the parking mechanism can be accommodated in the housing 9 of the power transmission device 1. Therefore, it is possible to reduce the size of the power transmission device 1, it is possible to reduce the number of components constituting the parking mechanism, it is possible to reduce the size of the parking mechanism, it is possible to simplify the structure, and it is possible to reduce cost.

Here, in the above embodiment, the engaging hole 18 is formed in the spindle 11 of the first planetary gear mechanism PG1, and the piston 27 and the spring 28 are provided in the spindle 19 of the second planetary gear PG2. In contrast, even if the piston 27 and the spring 28 are provided in the spindle 11 of the first planetary gear mechanism PG1, and the engaging hole 18 is formed in the spindle 19 of the second planetary gear PG2, the same effects as above are obtained.

In addition, in the above embodiment, a hydraulic pressure of oil is used to allow the piston 27 to slide. However, the piston 27 may be slid by an actuator such as an electromagnetic solenoid.

In addition, while a form in which the disclosure is applied to a parking mechanism provided in an electric vehicle power transmission device using an electric motor as a driving source has been described above, the disclosure can be similarly applied to a parking mechanism provided in a power transmission device for a hybrid vehicle using an electric motor and an engine as driving sources and a vehicle using only an engine as a driving source.

In addition, the application of the disclosure is not limited to the embodiment described above, and various modifications can be made within the scope of the claims and the scope of the technical ideas described in this specification and the drawings.

What is claimed is:

1. A vehicle parking mechanism provided in a vehicle power transmission device that transmits power output from a driving source to left and right axles through two planetary gear mechanisms and a differential device,
   wherein, in a carrier of one of the two planetary gear mechanisms, a piston engaged with and disengaged from a carrier of the other thereof is slidably provided,
   wherein the piston is engaged with the carrier of the other planetary gear mechanism when a vehicle is stopped, and
   wherein the piston is disengaged from the carrier of the other planetary gear mechanism other than when the vehicle is stopped.

2. The vehicle parking mechanism according to claim 1,
   wherein spindles that rotatably support planetary gears are fixed to the carriers of the two planetary gear mechanisms,
   wherein, in the spindle of the one of the two planetary gear mechanism, the piston is accommodated so that it is slidable in an axial direction, and a spring that biases the piston toward the other planetary gear mechanism is accommodated, and
   wherein, in the spindle of the other planetary gear mechanism, an engaging hole for engagement and disengagement with respect to the piston is formed.

3. The vehicle parking mechanism according to claim 2,
   wherein, in an oil path formed in the spindle of the one of the two planetary gear mechanism, the piston is accommodated so that it is slidable in the axial direction, and the spring is accommodated,
   wherein, when a vehicle is stopped, the piston biased by the spring is engaged with the engaging hole formed in the spindle of the other planetary gear mechanism, and the state becomes a parking ON state, and
   wherein the piston is slid against a biasing force of the spring due to a hydraulic pressure of oil that flows through the oil path other than when the vehicle is stopped, and is disengaged from the engaging hole formed in the spindle of the other planetary gear mechanism, and the state becomes a parking OFF state.

4. The vehicle parking mechanism according to claim 3,
   wherein the piston is engaged with the engaging hole formed in the spindle of the other planetary gear mechanism when rotation phases of both the carriers are matched.

5. The vehicle parking mechanism according to claim 3,
   wherein the periphery of an opening of the engaging hole formed in the spindle of the other planetary gear mechanism is chamfered.

6. The vehicle parking mechanism according to claim 2,
   wherein the piston is engaged with the engaging hole formed in the spindle of the other planetary gear mechanism when rotation phases of both the carriers are matched.

7. The vehicle parking mechanism according to claim 2,
   wherein the periphery of an opening of the engaging hole formed in the spindle of the other planetary gear mechanism is chamfered.

* * * * *